(12) United States Patent
Schmidt et al.

(10) Patent No.: US 7,501,064 B2
(45) Date of Patent: Mar. 10, 2009

(54) INTEGRATED ELECTRO-PRESSURE MEMBRANE DEIONIZATION SYSTEM

(75) Inventors: Ernst Schmidt, Knoxville, TN (US);
Alois F. Sferrazza, Knoxville, TN (US);
Michael E. Williams, Albany, KY (US)

(73) Assignee: EET, Harriman, TN (US)

( * ) Notice: Subject to any disclaimer, the term of this patent is extended or adjusted under 35 U.S.C. 154(b) by 463 days.

(21) Appl. No.: 11/030,542

(22) Filed: Jan. 6, 2005

(65) Prior Publication Data

US 2006/0144787 A1    Jul. 6, 2006

(51) Int. Cl.
*B01D 61/00* (2006.01)
*B01D 63/00* (2006.01)
*C25D 17/00* (2006.01)

(52) U.S. Cl. .................. 210/652; 210/653; 210/195.2; 210/257.2; 210/641; 204/522; 204/523; 204/524; 204/526; 204/805

(58) Field of Classification Search ......... 210/650–653, 210/195.2, 257.2, 641; 204/522, 523, 526, 204/524, 805, 525
See application file for complete search history.

(56) References Cited

U.S. PATENT DOCUMENTS

| | | | | |
|---|---|---|---|---|
| 5,057,197 | A | * | 10/1991 | Perry et al. ................. 210/652 |
| 6,030,535 | A | * | 2/2000 | Hayashi et al. ............. 210/652 |
| 6,056,878 | A | * | 5/2000 | Tessier et al. ............... 210/639 |
| 6,117,297 | A | | 9/2000 | Goldstein |
| 6,187,197 | B1 | | 2/2001 | Haddock |
| 6,187,201 | B1 | * | 2/2001 | Abe et al. ................... 210/652 |
| 6,190,556 | B1 | | 2/2001 | Uhlinger |
| 6,274,020 | B1 | | 8/2001 | Schmidt et al. |
| 6,365,023 | B1 | * | 4/2002 | De Los Reyes et al. ..... 204/524 |
| 6,461,491 | B1 | * | 10/2002 | Hryn et al. .................. 204/523 |
| 6,537,436 | B2 | * | 3/2003 | Schmidt et al. ............. 204/542 |
| 6,620,327 | B2 | | 9/2003 | Haddock |
| 6,649,037 | B2 | * | 11/2003 | Liang et al. ................. 204/632 |
| 6,755,951 | B1 | * | 6/2004 | Mani .......................... 204/523 |
| 7,083,730 | B2 | * | 8/2006 | Davis .......................... 210/652 |

* cited by examiner

*Primary Examiner*—Ana M Fortuna
(74) *Attorney, Agent, or Firm*—Pitts & Brittian PC (57) ABSTRACT

An integrated treatment system using electrodialysis and pressure-driven membranes for deionizing and decontaminating liquids to a near-pure quality for use or reuse in industrial or municipal operations. The integrated system includes steps of pre-filtering contaminated feed liquids blending the filtered liquids in preparation for treating the mixed liquids in parallel or sequential treatment steps utilizing nanofiltration or reverse osmosis, proceeded by or followed by an integrated electrodialysis treatment. A control means selectively directs mixed liquids to each of the treatment units for treatment in parallel or in series depending on the conductivity and residual contaminants in the mixed liquids. In comparison with nanofiltration or reverse osmosis only systems, or electrodialysis only systems, the integrated system provides improved efficiencies for treatment, requires less energy to operate, and reduces maintenance and capital costs.

10 Claims, 6 Drawing Sheets

INTEGRATED ELECTRO-PRESSURE MEMBRANE DEIONIZATION SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The invention pertains to a system for purification of contaminated liquids. More particularly, this invention pertains to a system for treatment utilizing a plurality of electric-driven membranes and pressure-driven membranes in a plurality of integrated configurations for removal of contaminants and deionization of liquids.

2. Description of the Related Art

In many areas of the world, treatment of saline water and industrial wastewater is necessary to obtain adequate and protect existing supplies of drinking water. In highly developed countries, recycling of waste liquids generated by industry is required by government regulations, and/or is preferred by industry to maximize recovery of useful liquids, to reduce costs of feed liquids, and to minimize waste discharge.

Currently, a number of systems are utilized for desalination and deionization applications, and for treating aqueous waste streams and aqueous/organic mixtures, including membrane-based technologies, distillation and evaporation, and ion exchange. Membrane-based desalting technologies may be categorized as pressure-driven reverse osmosis (RO) and nanofiltration (NF) and electrically-driven electrodialysis (ED). RO, NF, and ED have commonality in that these processes use semi-permeable membranes as key elements in performing the separation, resulting in significant energy savings compared to thermal processes such as distillation or evaporation, and substantial operational cost savings compared to ion exchange resin methods.

The pressure driven processes ultrafiltration (UF), RO, and NF rely on a semi-permeable membrane to separate one component of a solution from another by means of size exclusion, preferential transport, and pressure. UF typically rejects organics over 1,000 molecular weight (MW) while passing ions and small organics along with water, while RO provides separation of both ions and many small organics. NF provides separation in the range between UF and RO. NF membranes have a wide range of performance characteristics but typically reject organic solutes on the order of a nanometer or 10 angstroms in size as well as larger, highly charged multivalent ions such as sulfate and phosphate. NF will typically not efficiently retain or reject smaller species like chloride and organic acids UF, NF, and RO systems provide varying filtration and separation efficiencies but many times may lack the ability to economically produce a deionized product liquid of sufficient quality or quantity for reuse in industry, discharge, or municipal use; additional treatment may also be required as some components of the liquid may fall outside the operating ranges where separations are the most efficient and economically feasible for these membrane processes NF and RO processes have been widely utilized for a range of desalination and deionization applications, but product recovery has a major impact on the economics of pressure-driven membranes and limits process applicability. Furthermore, pressure-based membranes have several inherent technical and economical limitations to achieving high feed recoveries, the most severe of which is the osmotic pressure of the feed solution that has to be overcome by the applied hydrostatic (feed) pressure. The osmotic pressure of saline solutions such as brackish water and seawater can be significant. Moreover, since the osmotic pressure is determined by the salt concentration directly at the membrane surface, it can be affected by concentration polarization, which is the build-up of salt near the surface of the membrane due to incomplete mixing of the surface boundary layer fluid with the bulk solution, a phenomenon accentuated by high pressure fluid passing through the membrane material. Although concentration polarization can be minimized by design and operating parameters, it can never be completely excluded and must be overcome by increased applied hydrostatic (feed) pressure, particularly as feed recovery is increased. Overcoming high osmotic pressures and concentration polarization resulting from higher recoveries requires not only substantial energy to produce the necessary higher pressures and flow rates but also additional investment in capital cost for additional membrane area and pumping capacity. It can also result in shorter useful life of the membrane due to compaction effects and enhanced fouling that can occur at higher pressures and recoveries as a result of the concentration of scaling components near the surface of the membrane, particularly for membrane elements near the end of the process line where overall water recoveries are higher. Enhanced fouling increases the required frequency of membrane cleaning, increasing labor and chemical cost, and reducing throughput. For feeds with total dissolved solids (TDS) levels typical of seawater, recoveries approaching and beyond 50% are seldom feasible; for brackish water levels of TDS, recoveries beyond 80% are rarely economical, resulting in substantial waste of pretreated feed that must be returned to the source or alternately disposed.

Furthermore, membrane process equipment size is determined according to feed or concentrate flow requirements and decreases with increased recovery rate and lower feed concentration; conversely, pressure based membranes perform optimally, producing the best product quality and highest permeate flux rates, with low recoveries and low concentration feeds. Energy requirements are also directly related to feed pressures and feed water flow rates necessary to achieve a particular recovery. The design permeate flux rate predicted at a particular recovery likewise affects the number of pressure vessels, manifold connections, and size of membrane skid, as well as the size of the feed water supply systems and pretreatment equipment that are necessary.

Consequently, it is clear that a critical parameter that has the largest effect on investment and operating cost for pressure-driven membrane methods in most applications is the recovery rate ratio of permeate to feed. The feed flow is inversely proportional to the design recovery rate; therefore, the recovery rate directly affects the size and cost of all process equipment and power consumption. Higher recovery rate also contributes to reduced pretreatment capital cost and chemicals used. However, higher recoveries can increase membrane replacement cost as a result of fouling and compaction. Furthermore, pressure based membrane systems inherently perform better at lower feed concentrations and lower recoveries in which the osmotic pressure of the feed and its fouling and scaling potential are minimized.

In an electrodialysis (ED) process, separation, removal, or concentration of ionic species is accomplished by the selective transport of the ions through ion exchange membranes under the influence of an electrical field. Flowing through the series of anion and cation exchange membranes arranged in an alternating pattern between the electrodes having an electrical potential difference, the water diluate (D) feed stream (e.g., seawater for desalination), concentrate (C) stream, and electrode (E) stream are allowed to circulate in the appropriate cell compartments. Under the influence of the electrical potential difference, the negatively charged chlorides, sulfates, and other anions in the diluate (D) stream migrate toward the anode. These ions pass through the positively charged anion exchange membrane, but are rejected by the negatively charged cation exchange membrane and therefore stay in the C stream, which becomes concentrated with the ionic contaminants. The positively charged species such as sodium and other metals in the D stream migrate toward the cathode and pass through the negatively charged cation exchange membrane. These ions also stay in the C stream, being rejected by the anion exchange membrane. The E stream is the electrode stream (e.g., a sodium sulfate solution), which does not become contaminated with any ionic species from the diluate or concentrate streams, although small amounts of hydrogen are generated at the cathode and oxygen at the anode which are subsequently dissipated as the E streams are combined to maintain a neutral pH in the E stream holding tank. The overall result of the ED processing is an ion concentration increase in the concentrate stream with a depletion of ions in the diluted feed stream.

Multi-cell electrodialysis (ED) process stacks are generally built of membrane sheets separated from each other by suitably configured gaskets. For efficient separations, the distance (gap) between the sheets is as small as possible. In most designs, a spacer is introduced between the individual membrane sheets, both to assist in supporting the membrane and to help control the liquid flow distribution. The ED process stacks are typically assembled in the same fashion as a plate-and-frame filter press, the gaskets corresponding to the frames and the membrane sheets corresponding to the plates. The ED process stack configurations include flow channels for distribution of liquids to be treated to each of various layered compartments which are formed by ingenious patterns of mating holes and slots through the gaskets and the membranes prior to assembly of the ED process stack (see U.S. Pat. No. 6,537,436, Schmidt et al.).

In typical ED process stacks, the flow pattern within each compartment (i.e., between any two successive membranes) is determined by the configuration of the gasket and spacer elements used between the membranes. Two distinctively different flow arrangements are typically used. One is known as a tortuous-path design which can incorporate pressure differentials of up to about 125 pounds per square inch between inflow/outflow portions of the ED unit, while the other flow arrangement makes use of a sheet-flow principle which can incorporate pressure differentials up to about 50 pounds per square inch between inflow/outflow portions of the ED unit. ED process stacks include limitations to constant operation at high efficiencies. One design problem for both flow arrangements for multi-membrane and multi-cell stacks is that of assuring uniform fluid flow to the various compartments and effective transport of the separated ionic constituents to the membrane surfaces for removal from the ED process stack. These difficulties are obstacles to economical demineralization.

ED also has inherent limitations, working best at removing low molecular weight ionic components from a feed stream. Non-charged, higher molecular weight, and less mobile ionic species will not typically be significantly removed. This can be a disadvantage when potable water is produced from feed water sources having high suspended solids content or which are contaminated by microorganisms, which would require additional pre-treatment processes for removal prior to ED processing.

Furthermore, the concentration that can be achieved in the ED brine stream (concentrate or "C" stream) is limited by the membrane selectivity loss due to the Donnan exclusion mechanism and water transport from the dilute to the brine caused by osmosis; in particular, at very high concentrations, diffusion of ions from the concentrate stream back into the diluate stream and transport of water across the membranes can offset separation resulting from the applied electric potential, resulting in a poor (i.e., higher ion concentration than desired) product. However, in general, significantly higher brine concentration can be achieved by ED than by RO and the problem of scaling (i.e., precipitation of insoluble di- or multi-valent salts such as calcium sulfate) is less severe in ED than in RO since mono-valent ions are in general transported through the ion exchange membranes faster than multi-valent ions, resulting in a brine less concentrated in the multi-valent ions and so having less scaling potential. In contrast to RO, ED becomes less economical when extremely low salt concentrations in the product are required, as the current density becomes limited and current utilization efficiency decreases as the feed salt concentration becomes lower: with fewer ions in solution to carry current, both ion transport and energy efficiently greatly declines. Consequently, comparatively large membrane areas are required to satisfy capacity requirements for low concentration (and sparingly conductive) feed solutions.

Furthermore, at low feed concentrations, the reduction of ionic concentration polarization becomes an important design issue for ED membranes. Ionic concentration polarization is the reduction of ion concentrations near the membrane surface compared to those in the bulk solution flowing through the membrane compartment. With substantial ionic concentration polarization, electrolytic water splitting occurs due to the deficiency of solute ions adjacent to the membranes that carry the requisite electric current needed for ED membrane operation. The electrolytic water splitting is detrimental to ED process stack efficiency because of the tendency of ionic concentration polarization to occur at the membrane surface due to the hydrodynamic characteristic of channel flow providing thin viscous boundary layers adjacent to confining surfaces (i.e. adjacent membranes). The thin viscous boundary layers impose a resistance to passage of ions much greater than that of a layer of like thickness in a turbulent area of channel flow, and hence increase the likelihood of ionic concentration polarization at the membrane surfaces. Ionic concentration polarization is objectionable due to an inefficient increase in energy consumption without increasing removal of ionic constituents, requiring increased membrane area, along with pH changes in the feed and concentrate streams due to water splitting causing scale deposition in ED stacks.

In general, additional membrane area can be included in an ED process stack to counteract low separation efficiencies. However, the number of cells in an ED stack is limited by practical considerations of assembly and maintenance requirements. Since the failure of a single electrodialysis (ED) membrane can seriously impair stack performance, the necessity to be able to disassemble and reassemble a stack to replace membranes, and the necessity to be able to perform this quickly and easily, effectively limits the number of membranes that can be practically utilized in a stack. As a result, it is often desirable to use several smaller modular-size ED stacks rather than one large ED stack by using several small subassemblies having about 50 to 100 cell pairs (CP), and arranging as many as 10 of these subassemblies in series in a single clamping press. However, such a configuration increases capital costs and makes the process less economically feasible.

An alternative to utilizing modular-size ED stacks or NF or RO alone for separations is to use ED, UF, microfiltration (MF), RO, NF, distillation, evaporation, and other processes in combination with or as a pretreatment in various configurations. However, each process has drawbacks as discussed hereinabove, and prior utilized hybrid systems (e.g., RO coupled with distillation) for increased recovery have been treated as individual unit operations arranged in series sequence, with no interdependence (e.g., RO concentrate only affects operation of the distillation unit, with no reciprocal impact), with each individual process retaining its individual drawback (e.g., low recovery of RO, high operating cost of distillation.

Due to the inadequacies of each of the separate NF, RO and ED treatment systems for deionization, there exists a need for an integrated approach to deionization systems utilizing multiple types of highly efficient liquid treatment subunits including electrodialysis (ED) membrane units operated in integrated configurations with nanofiltration (NF) and/or reverse osmosis (RO) units as determined by an operator, with the feed liquids for each subunit being channeled through at least one mixing unit in order to blend numerous liquid streams into feed liquid streams having constituents optimized for removal of both TDS solids and ionized constituents by the integrated deionization system. The current invention is not a traditional hybrid process, but instead is an integral process, overcoming limitations inherent to both single processes by integrating the two individual unit processes into a single interdependent system. This integrated, interdependent system allows both the pressure-based membranes and ED membranes to operate at the optimum efficiency point of each, with both systems' operation configured to be optimally affected and enhanced by the presence of the other system.

BRIEF SUMMARY OF THE INVENTION

In accordance with the present invention, an integrated electro-pressure membrane (EPM) system is provided for treating contaminated feed liquids in order to generate decontaminated and deionized product liquids for use or for reuse in place of "virgin" liquids. The EPM system includes a prefiltering step for the contaminated feed liquids, followed by blending the filtered liquids in a mixing unit, followed by any one of a plurality of treatment steps utilizing a NF treatment unit or a RO treatment unit operated in conjunction with an ED unit and the mixing unit.

Each disclosed embodiment of the integrated EPM system includes a central control means for an operator to control the fluid flow through respective filtering and treatment units in a parallel fluid flow configuration utilizing NF or RO units, with recirculation of reject liquid streams to at least one ED subunit. The EPM system is also readily operated in a sequential fluid flow configuration providing continuous flow through a pretreatment filtration unit, at least one ED unit, and a NF or RO unit. When operated in the sequential mode, the control means is adjustable to vary the voltage intensity supplied to the electric-driven membranes of the ED unit when a high purity decontaminated and deionized product liquid is desired.

The plurality of treatment units are maintained in fluidic interconnection and include a pretreatment unit, at least one mixing tank unit, at least one pretreatment filter unit, and one or more combinations of (a) a nanofiltration unit, or (b) a reverse osmosis unit, in combination with an electrodialysis unit disposed in fluid communication in series or parallel orientation. An operator provides input signals by control means for routing fluid flow through any one or more of the subunits (a) NF, (b) RO and/or (c) ED for generation of a product which is approximately 99% recovered relative to the input waste stream, a substantial improvement over the 70 to 96% recovery possible with conventional systems.

One embodiment of a membrane-based system for treating contaminated feed liquids includes an initial step of providing a pretreatment filtration unit through which contaminated feed liquids are filtered with a selected volume of pretreated filtrate liquid being channeled to a mixing unit for mixing with additional pretreated and recycled filtrate liquids. A step of transferring includes transferring through appropriately sized fluid conduits a selected volume of the mixed pretreated filtrate liquids to a second treatment unit consisting of an ED unit, a nanofiltration unit, or a reverse osmosis unit. If the second treatment unit is an ED unit, the pretreated filtrate liquids are electrically activated and are directed along a tortuous fluid path between a plurality of ED membranes, spacers, and gaskets whereby an ionic concentrate liquid is separated and removed from the filtrate liquids forming a decontaminated product liquid; channeling the ionic concentrate liquid for mixing with a diluate liquid stream and directing the liquid mixture through a pressure driven membrane unit providing pressure induced liquid transfer across permeable membranes while excluding passage of a specified size or ionic charge of contaminants by the pressure driven membrane unit to generate a decontaminated liquid for storage, and a concentrated reject liquid redirected to the mixing unit for blending and additional treatment in the NF or RO units, or in the ED unit, depending on constituents remaining in the blended concentrated reject liquid.

Feed rate to the surge tank and permeate flow rate out of the system can be constant, thus making it a continuous process, or feed to the tank can be batch-wise added, making the system a semi-continuous process. Feed and product salinity may be controlled as desired by adjusting ion-exchange membrane and pressure membrane areas of the ED unit and the NF or RO unit, respectively, to continuously remove and concentrate the desired mass of salt necessary to optimize performance of the EPM system. Furthermore, in addition to optimizing the respective ED and NF or RO membrane areas, the selection of membrane types for the ED, NF, or RO best suited for the particular desalting application's performance specifications, and offering the operational synergy between the ED and NF or RO units, provides the basis for optimizing the EPM system to provide the least cost and/or highest performance, integral desalting system. Consequently, this integrated apparatus and method may be used to retrofit and optimize performance of existing NF and RO treatment systems.

Furthermore, the proposed current EPM process also eliminates the need for additional staging of both NF or RO as well as the ED component, which differs from other desalting processes in the degree of desalting achieved in a single stage. NF or RO or ion exchange desalination may require more than one pass to achieve desired product quality. In ED the degree of desalting will usually be limited to 50% per pass, and some type of staging is needed for further desalting. This is normally achieved by passage through additional stacks or internal electric and/or hydraulic stages in one stack assembly. Batch recirculation is simplistic and the least capital cost intensive arrangement. Batch recirculation with ED alone however is less effective because of the lack of steady state, the high power requirements, and variable current density necessary. Variable current density leads to current efficiencies outside of the optimal range in stand alone ED processes. The novel integrated EPM process overcomes this limitation where a constant state of high current utilization efficiency may be maintained.

Another advantage of the proposed invention is that a more optimum feed concentration is maintained for both units, ED and NF or RO of the process. In the traditional continuous NF or RO system, as permeate is recovered, increased salt concentration is fed to the next membrane element in the system, resulting in decreased flux and lower product quality from that element. In a batch system in which concentrate from the NF or RO elements is returned to the feed tank, the concentration in the feed tank also increases over time, resulting in decreased water permeate flux and product quality for all membrane elements in the system. In the current invention, both in continuous and batch operation, the coupled ED unit works to decrease the concentration in the feed tank, resulting in a feed to the NF or RO unit with lower salt concentration, thus allowing higher permeate flux and product quality. In addition, as concentrate from the NF or RO unit is returned to the surge tank, it helps to maintain a constant salt concentration in the tank, allowing feed concentration to the ED unit to be maintained at a level sufficient to provide good current efficiencies for transport of ions. Consequently, both systems operate in the more optimum and energy efficient range for maximizing production and product quality.

A further benefit of the EPM process is that scaling components and subsequent NF or RO scaling is minimized. The ED unit actively transports multi-valent ions such as calcium and sulfate across the ED membranes, maintaining these at a constant or lower level than would be observed if NF or RO alone with multiple stages or concentrate recycle were employed. As a result, reduced concentrations of multi-valent ions such as calcium and sulfate which tend to scale and foul NF or RO membranes are reduced, leading to improved production rate and permeate characteristics, increasing the time required between cleaning operations, and providing longer NF or RO membrane life.

Another benefit of the current invention is that improved recoveries are possible compared to NF or RO only systems. Recoveries as high as 99+% are possible using EPM since the feed concentration is maintained at relatively constant level due to the combined separation actions of each sub-system. Since feed concentration is relatively constant, the osmotic pressure, and so productivity, of the NF or RO membranes remain constant over the entire processing time (for batch) or recovery range (for continuous systems), allowing almost complete reclamation of the feed. The resulting enhanced recovery can greatly improve the economic feasibility and cost effectiveness of a variety of desalination operations. Cost components of interest affected by improved recovery include pretreatment costs, value of recovered product, cost of disposal of concentrate, capital cost, and energy cost required to perform the additional recovery.

Another advantage of the current invention is improved product quality compared to NF or RO or ED only systems. Since the feed concentration is relatively constant over the whole range of recoveries, the rejection of the salts and productivity of the NF or RO remains constant, resulting in improved permeate product compared to NF or RO only systems in which the permeate product quality would decrease as a function of recovery.

Another advantage is lower energy requirements compared to ED only systems. While ED only systems are capable of 99+% recovery, treatment to achieve low concentrations or treatment of dilute or sparingly conductive solutions results in low energy efficiencies and the need for decreased production rate or increased membrane area and capital costs. The EPM integrated system ensures that each sub-system operates in the feed concentration range where it is most energy efficient and removal effectiveness for each subsystem is optimal, resulting in lower energy operating costs.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

In the embodiments illustrated in FIGS. 3, 4, 5A, and 5B of the integrated electro-pressure membrane (EPM) systems 14, 16, 18, and 18', provide treatment of contaminated feed liquids 22 such as glycol based thermal transfer liquids in which ionized constituents are present along with metals and other insoluble contaminants and soluble or colloidal contaminants. Typical candidates for treatment by an EPM system includes feed liquids such as industrial wastewaters, industrial-grade spent ethylene glycol, other glycol/water mixtures used in vehicular engine coolant systems, out-of-specification liquids from pharmaceutical production, and/or waste organic chemicals from petrochemical industries including certain solvent liquids deemed valuable if recovery and recycling of the solute and solvent are not cost-prohibitive. Desalination of brackish water and seawater is also a possible application. Furthermore, the EPM process should not be limited to use of ED as minor modifications through the use of bi-polar membranes to recover acids and bases from corresponding salts is possible. Similarly, the EPM process may employ non-conventional electro-deionization methods, for instance continuous deionization (CDI), in conjunction with NF or RO as well.

Membrane-based deionizing technologies may be categorized as pressure-driven membrane units, UF, NF and/or RO, and as electrical-driven ED units. Operation of a pressure-driven process utilizes a plurality of semi-permeable membranes to separate one constituent of a solution from another by means of constituent size exclusion and pressure. A filtration unit 20 having at least one filtration membrane, and/or filtration media such as layers of screens or porous material, is typically utilized with sufficient pore diameters to deny passage of insoluble particles, oils and/or organics over 1,000 molecular weight (MW), and optimally operates for selective separation of constituents in a range between about 30 Angstroms (Å) to about 1000 Å, while passing smaller ions along with water. A RO unit 50 is typically utilized for separation of constituents in the range between about 1 Å to about 20 Å. A RO unit 50 is typically operated at pressures of about 200 to about 1000 pounds per square inch maintained between inflow/outflow portions of the RO unit 50. A NF unit 44 is typically utilized to provide separation of ions and selected organic compounds from water in a size range between UF and RO treatment. NF membranes have a wide range of performance characteristics and typically provide removal of constituents in a range between about 8 Å to about 200 Å, depending on the selectivity of the NF membranes. A pressure-driven NF unit 44 is typically operated to maintain fluid pressures between about 50 pounds per square inch to about 1,000 pounds per square inch maintained between inflow/outflow portions of the NF unit 44. One preferred EPM system includes a NF unit 44 or a RO unit 50 capable of operations to maintain fluid pressures between about 50 pounds per square inch to about 400 pounds per square inch for low pressure fluid treatment applications. Another preferred EPM system includes a NF unit 44 or a RO unit 50 capable of operations to maintain fluid pressures between about 400 pounds per square inch to about 1,000 pounds per square inch for high pressure fluid treatment applications.

An ED system can be operated for removing low molecular weight ionic constituents of between about 1 Å to about 10 Å from a feed stream. As a contaminated and pressurized liquid is pumped through an ED membrane cell stack 68 having a plurality of interleaved with spacer layers, gaskets, and at least one anion plate and at least one cation plate, the ionic constituents are transported toward the respective anion plate and cation plate under the influence of an electric field for removal of the ionic constituents from the liquid to form a diluate liquid referred to as a decontaminated product liquid 76. A disadvantage of an ED operation is that non-charged constituents and higher molecular weight contaminants are not typically efficiently removed by an ED unit. Conversely, NF and/or RO subunits will operate optimally to remove highly charged and some non-charged constituents and higher molecular weight contaminants, but will not typically be as efficient at removing smaller molecular weight and mono-valence charged constituents from a feed stream. The commonality of combining NF or RO subunits in series or in parallel with an ED unit, and providing for pretreatment and blending in a central mixing tank allows for optimal separation of contaminants and ionized constituents by each subunit, resulting in significant energy savings compared to thermal separation processes such as distillation or evaporation, and substantial operational cost savings compared to ion-exchange resin process units. The integrated EPM system provides a plurality of treatment units including a multi-cell electrodialysis unit 60 which removes ionic constituents and provides treatment of the NF or RO reject liquids 72' after blending in a mixing unit 30 thereby allowing multiple treatment options and providing maximum recovery efficiency.

Figure 1:
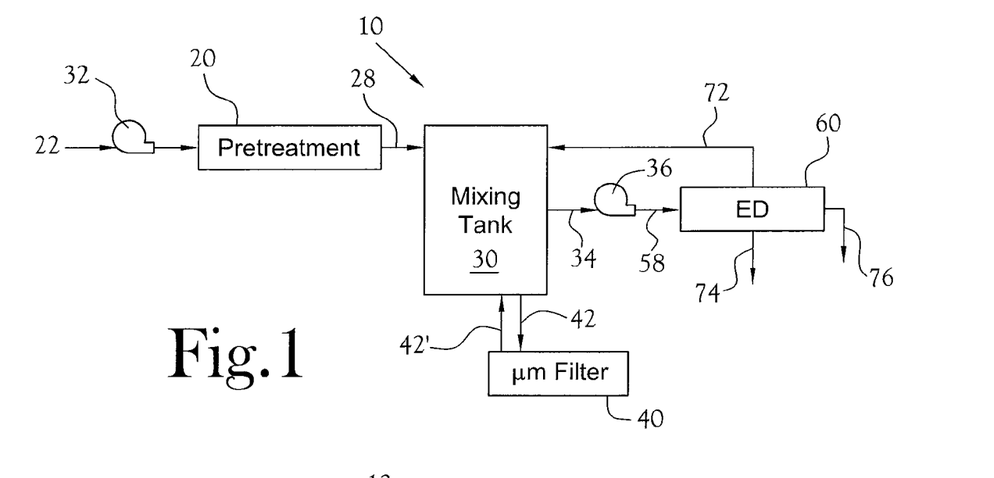
FIG. 1 is a flow diagram of one embodiment of a typical ED only system for comparison with the present invention, illustrating pretreatment and recycling operations with an ED unit coupled with microfiltration.
Figure 2:
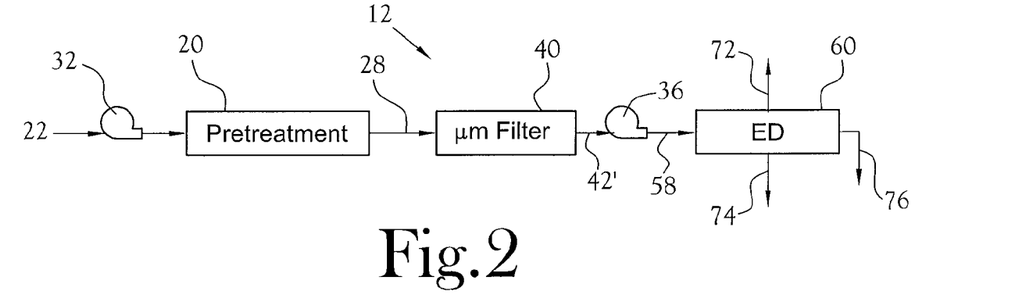
FIG. 2 is a flow diagram of another embodiment of a typical ED only system of FIG. 1, including flow through pretreatment filtration and pressurized filter treatment in conjunction with an ED unit.

For each of the ED membrane units 60 utilized in treatment systems 10, 12, 14, 16, 18 and 18', an ED membrane cell stack 68 typically includes a plurality of stacked membrane layers having interdisposed spacers, gaskets and turbulence layers. Each ED membrane stack 68 (see FIG. 5A) includes at least one inlet and at least one fluid outlet for rapid liquid flow therethrough while an electric potential is maintained across the stacked layers by at least one positive electrode or plate 62 and at least one negative electrode or plate 62'. Pumps associated with each ED membrane cell stack 68 include a concentrate liquid pump 64 and an electrolytic liquid pump 66 (see FIG. 5A). Each ED unit 60 is capable of operating with constant flow or batch fluid flow during treatment in sequence (see FIGS. 2, 4 and 5B), or during treatment in parallel (see FIGS. 1 and 3). A plurality of arrangements of ED membranes interleaved with spacers, gaskets and turbulence inducement layers are combined in stacked configuration 68 depending upon the amount of membrane surface area desired for each ED unit. In one embodiment of the integrated EPM system, ED membranes are separated by spacers composed of ethylene propylene diene terpolymer (EPDM). Those skilled in the art will recognize that a variety of materials are readily available for ED membranes and gaskets utilized in an ED stack 68. Clamping of the ED membranes and gaskets together in an ED stack is accomplished by perimeter oriented connectors, or centrally oriented connectors extended through the ED membranes and gaskets, in order to improve the uniformity of the clamping force distribution on the ED gasket area. Threaded connector members are preferably utilized as connectors to reduce assembly labor time for each ED stack 68 used, and to facilitate change-out of ED membranes when the membranes are spent.

Figure 3:
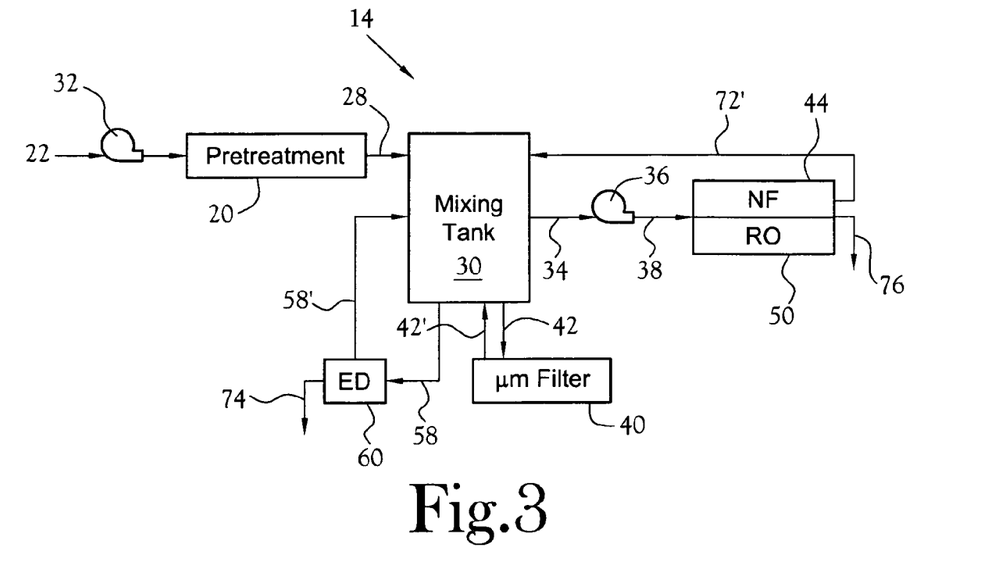
FIG. 3 is a flow diagram of the current invention EPM system, including parallel operation of an ED unit, a filtration unit, and a NF or RO unit with a single mixing tank serving as feed to both units.

One embodiment of the integrated electro-pressure membrane (EPM) system 14 includes parallel treatment of contaminated feed liquids 22 utilizing pressure-driven membrane units 44, 50 having a plurality of pressure-driven membranes through which liquids from the mixing tank 30 are channeled, and at least one electrodialysis membrane unit 60 (see FIG. 3). A volume of contaminated feed liquids 22 is pumped 32 through a pretreatment filtration unit 20, for removal of micron-sized particles before transfer from at least one effluent channel of the filtrate 28 to the mixing tank 30. Either within the mixing tank 30 or partially external of the mixing tank, a means for mixing is provided in order to rapidly mix the filtrate 28 and additional fluids returned to the mixing tank 42', 58', 72, 72' (discussed further herein). The means for mixing can include a mechanical mixing device having an interior rotating or pivoting member, an interior vibrating member, an interior fluid channel outlet from recirculating pumps, or a similar mixing device as known by those skilled in the art. The integrated EPM system 14 includes an operator adjusted control means 80 providing liquid transfer 58 from mixing tank 30 into an ED unit 60 for electric-driven liquid treatment. A deionized liquid 58' is generated and returned to the mixing tank 30 in order to reduce the concentration of ionic constituents in feed liquids in the mixing tank 30 before mixed liquids are transferred 38 and pressurized by the second pump means 36 to the NF unit 44, or to a RO unit 50, for pressure-driven removal of contaminants. A polishing step is provided for liquids transferred through a micron filter unit 40 concurrent with operation of the ED unit 60, in which an operator selects transfer 42 of mixed liquids through micron filter unit 40 or a UF unit before a filtrate 42' is transferred back to a mixing tank 30 for subsequent transfer 34, pressurization by the second pump means 36, and transfer 38 for pressure-driven treatment in NF unit 44, or RO unit 50, if utilized. The maximum practical efficiency of a typical nonintegrated ED unit is typically about 90% to about 96% removal of ionic constituents. Testing results 90, 92 have provided efficiency values for the diluate forming the decontaminated product liquid 76 recovered from integrated EPM embodiments 14, 16, 18, and 18' (see FIGS. 3, 4, 5A, and 5B), including treatment in a NF 44 or a RO unit 50, and an ED unit 60, of about 98+% efficiency 92 over a significantly short run time (see FIG. 6).

Additional configurations for combining the two sub-systems include providing sequential treatment of liquids (see FIGS. 4 and 5B), or parallel treatment of liquids (see FIG. 3), in numerous combinations of an ED unit 60 and a NF unit 44, or a RO unit 50 if utilized, and a liquid mixing tank 30. For each integrated EPM system disclosed herein, when the feed rate 28 to the mixing tank and the effluent flow rate for decontaminated product liquid 76 are generally constant, the treatment system is identified as a continuous process. When the feed rate 28 to the mixing tank 30 includes sequential batch volumes, the system is classified as a semi-continuous process. For each integrated EPM system, the volume and conductivity is monitored by sampling devices such as conductivity sensors reporting to control means 80 for specific liquid transfers within the system, such as mixed liquids transfer 38 to the NF or RO units, and liquids transfer 58 to the ED unit 60. In addition, monitoring of the filtration pressures for the NF or RO units, and the strength of electrical field(s) for each ED unit 60 are monitored and controlled by the control means 80 which includes computer circuitry for multiple analyses of liquids during transfers, of liquids blended in mixing unit 30, and of liquids after each treatment unit. The control means 80 includes visual readouts of the liquid conductivity and pressure parameters for each subunit, and adjustable controls 82 for operating each unit of the integrated EPM system. The visual readouts and controls 82 allow an operator to monitor performance of each unit during operation and provide a control means for an operator to increase or decrease the operating parameters of mixing tank 30, the NF unit 44, the RO unit 50 if utilized, and the ED unit 60.

Figure 6:
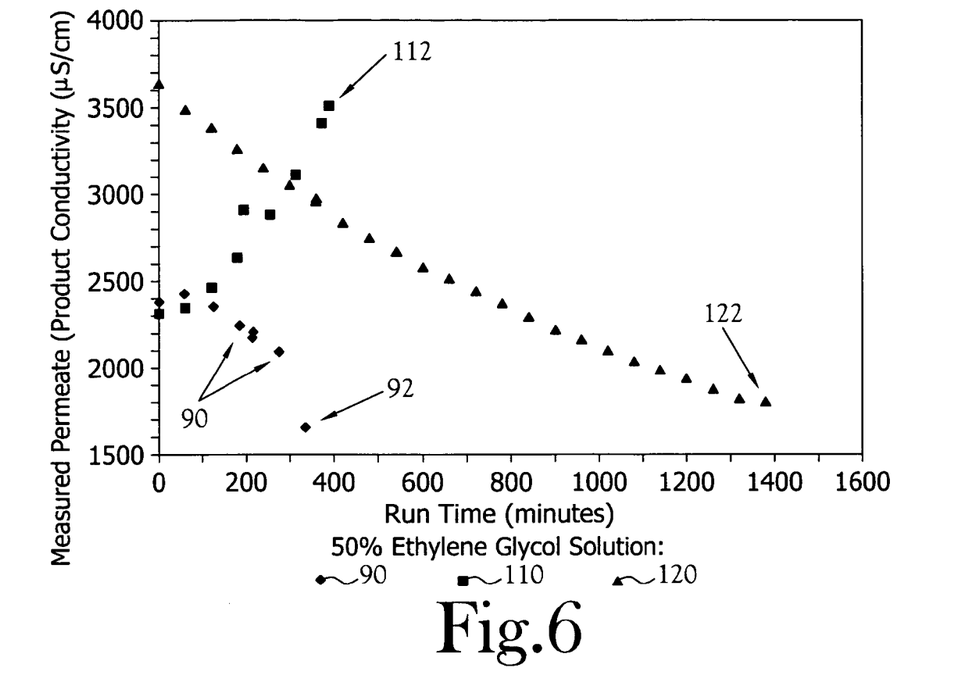
FIG. 6 is a graphical representation of reduction in product conductivity of permeate by an integrated EPM system compared to a NF only system or an ED only system.
Figure 7:
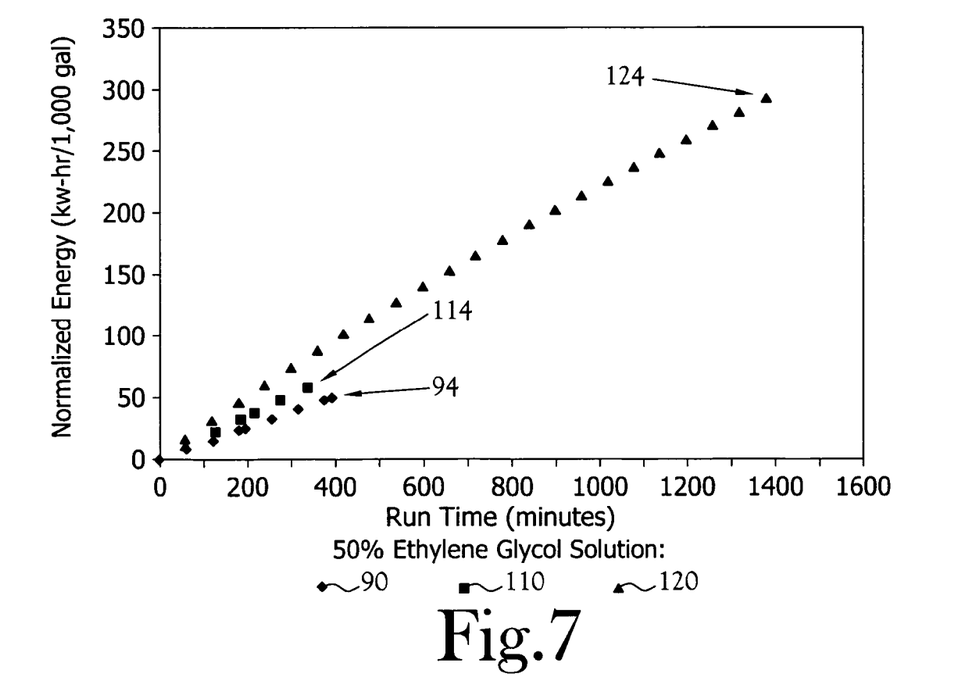
FIG. 7 is a graphical representation of energy use by an integrated EPM system during generation of permeate compared to a NF only system or an ED only system.

Each integrated EPM system utilizes a common mixing tank 30 from which feed liquids are transferred 34, 58 to each of a plurality of treatment units 40, 44, 50 and 60. Control of the liquids added to the common mixing tank 30 by an operator's adjustments of control means 80, provides for optimized parameters of low concentrations of non-ionic contaminants and control of mixed liquids conductivity when liquids are transferred to each treatment unit 40, 44, 50, 60, thereby providing improved overall system efficiency as measured by a decrease in decontaminated product liquid 76 conductivity (i.e. removal of ionic constituents). Actual performance parameters of the integrated EPM system 90, 92 have been tested to maintain about 98+% recovery efficiency during integrated system operations, as compared to a NF only system 110, 112 (about 90%), or an ED only system 120, 122 (about 90% to about 96%) over similar run times (FIG. 6). Use of a common mixing tank 30, as opposed to two or more separate filtrate and permeate storage tanks, provides a central control of feed liquid flow, and allows for rapid adjustments to the system run time for optimizing reduction in permeate conductivity during run time to maintain performance at 98+% while minimizing energy usage for the integrated EPM system 90, 94, compared to a NF only system 110, 114, or an ED only system 120, 124 over similar run times (see FIG. 7).

Figure 4:
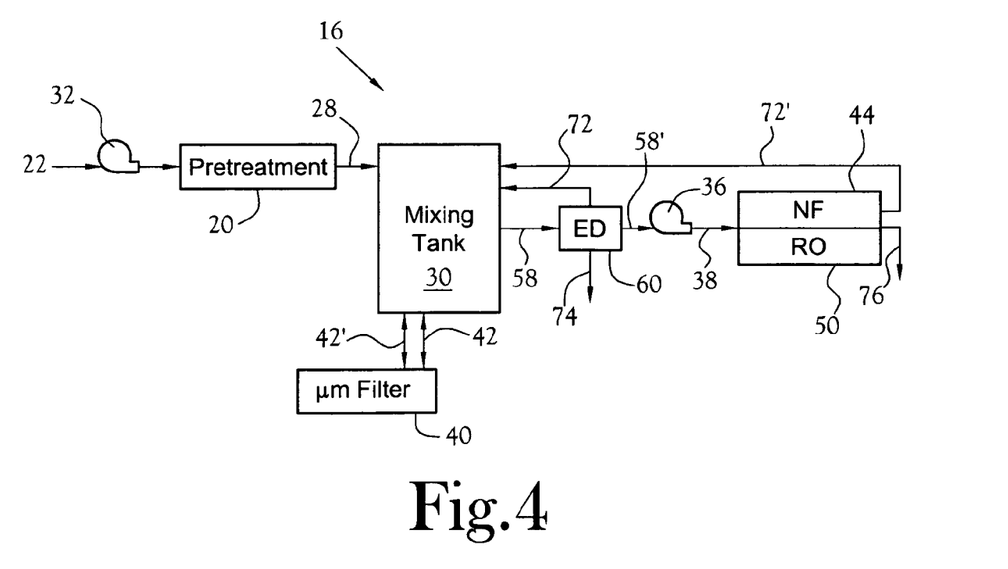
FIG. 4 is a flow diagram of an additional embodiment of the EPM system of FIG. 3 including sequential liquid flow through an ED unit and a NF or RO unit with a single mixing tank serving as feed to both units.

The integrated system illustrated in FIG. 4 is a sequential process having a filtration unit 40 operating in parallel with operation in series for the ED unit 60 and NF unit 44, or a RO unit 50. Contaminated feed liquids 22 having ionic constituents and non-ionic constituents are pumped 32 through a pretreatment filtration unit 20, for removal of micron-sized particles and delivery of the filtrate 28 to the mixing tank 30. The integrated EPM system 14 includes an operator adjusted control means 80 providing control of the mixed liquid transfer 58 into the ED unit 60 for electric-driven liquid treatment. Treatment in the ED unit 60 provides for generation of a deionized product liquid 76 which is released for reuse in commerce, and concentrated brine 74 which is removed for discard. Additional effluents from the ED unit 60 can include a non-specification liquid portion 72 (see FIGS. 1 and 2) which is transferred by a recycle channel to the mixing tank 30, or discarded. Alternative pathways for partially deionized fluids 58' are illustrated in FIGS. 3, 4 and 5B, with the effluent 58' from the ED unit 60 being transferred to pressure-driven filtration units 44 or 50 (see FIG. 4), or the partially deionized fluids 58' being transferred by recycle channels for mixing in the mixing tank 30 (see FIG. 5B). The deionized diluate liquid 58' is transferred and pressurized by the second pump means 36 for pressure-driven treatment in the NF unit 44, and/or in a RO unit 50 if utilized, to generate a pressure-driven membrane separation of non-ionized constituents to generate a permeate liquid identified as the decontaminated product liquid 76. A second non-specification liquid portion 72' is generated and transferred after NF or RO treatment to the mixing tank 30 for blending with pretreated liquid 28 and filtrate liquid 42' in order to reduce the concentration of ionic constituents in feed liquids in the mixing tank 30 before mixed liquids are transferred 38 and pressurized by second pump means 36 to the NF unit 44, or to a RO unit 50, for pressure-driven removal of non-ionized contaminants. A deionized and decontaminated product liquid 76 is generated by the integrated system 16 which is reduced in conductivity at an overall efficiency of about 98+%, when compared to a NF only system 110 (approximately 90% efficient 112), or an ED only system 120 (approximately 96% efficient 122) over similar run times (see FIG. 6).

Figure 5A:
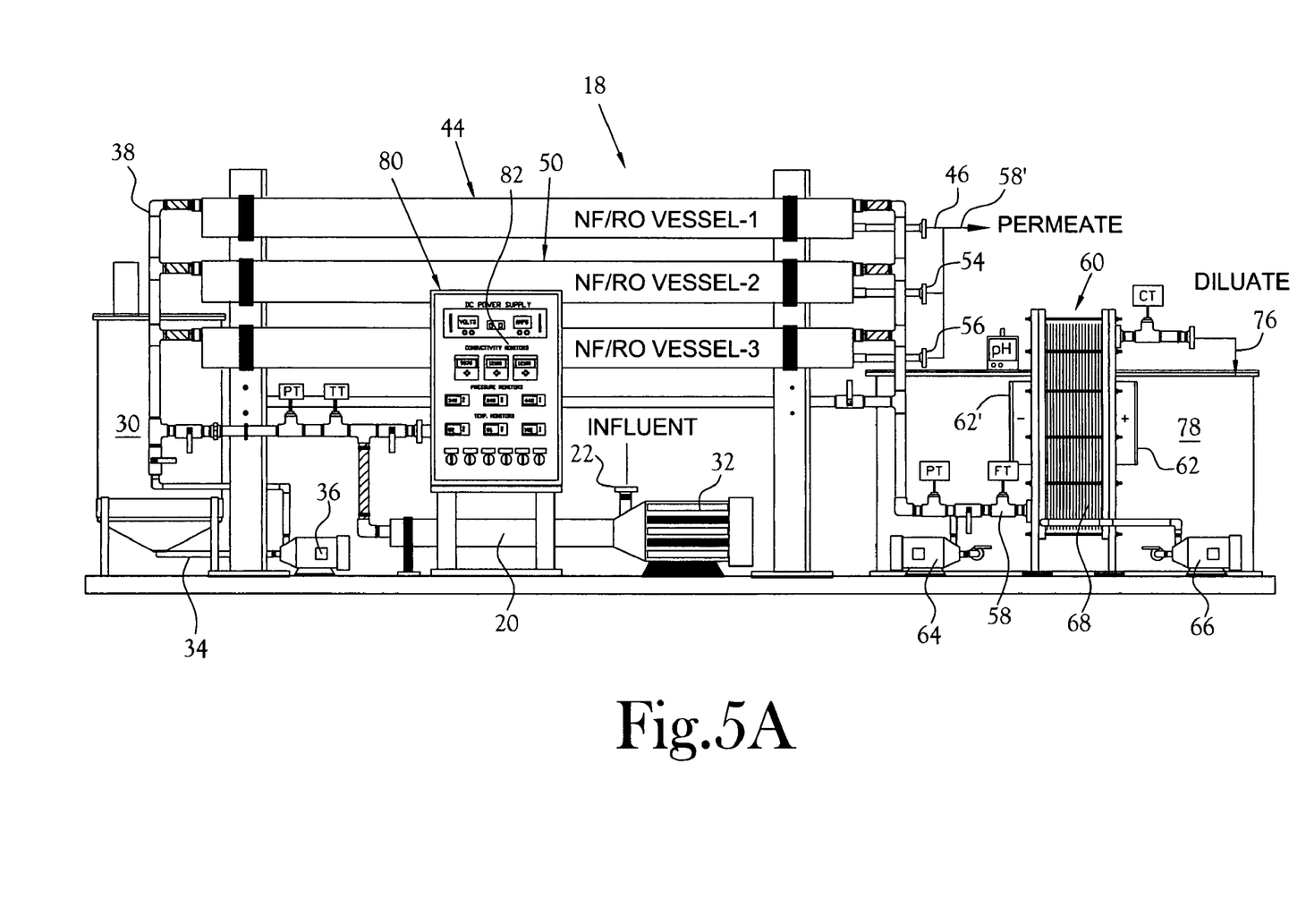
FIG. 5A is a schematic view of one embodiment of an EPM system illustrating a plurality of liquid treatment units including a NF/RO unit and an ED unit controlled by a central control means.
Figure 5B:
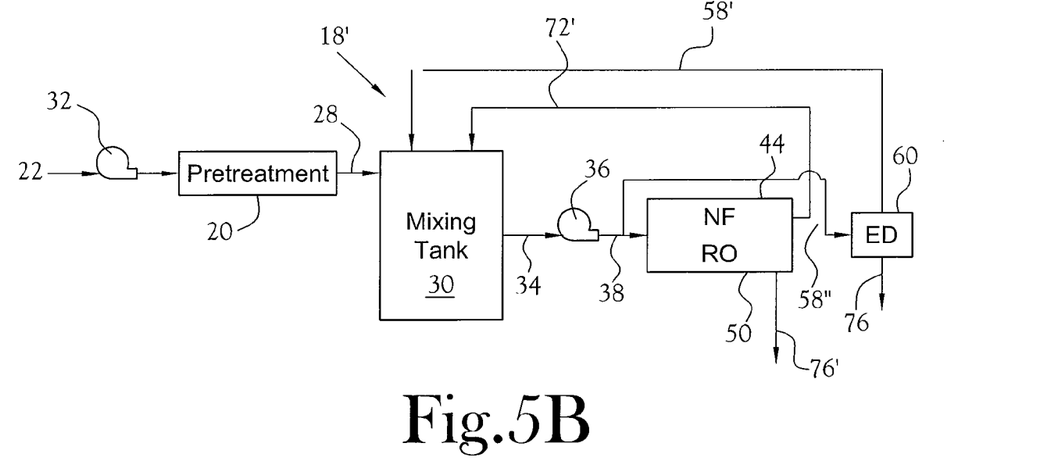
FIG. 5B is a flow diagram of the embodiment of FIG. 5A, including sequential liquid flow through a NF or RO unit and an ED unit controlled by a central control means.

In FIG. 5A, an equipment configuration 18 is illustrated for equipment typically utilized for each of the treatment units of the integrated EPM system 16. All of the treatment units of FIG. 5A are not required for operation of integrated EPM systems. The control means 80 provides a means for an operator's control and shut-down of treatment units not needed for treating feed liquids 22 lacking certain contaminants. The integrated system optimizes treatment options while delivering energy cost savings by selectively channeling filtered and mixed liquids 42', 58 by activation of appropriately positioned valves and pumps to allow liquid flow to appropriate system units as selected by an operator having knowledge of the composition of the mixed liquids 42', 58 in conjunction with knowledge of the current operational performance parameters of each system unit. The specific treatment units of FIG. 5A are discussed further herein for the embodiments illustrated in FIGS. 3, 4, and 5B.

An additional embodiment for an integrated system 18' is illustrated in FIG. 5B, which utilizes the equipment and control means 80 illustrated in FIG. 5A. The integrated system 18' is a sequential process providing liquid treatment in a NF unit 44 or a RO unit 50, followed in series by liquid treatment in an ED unit 60. Contaminated feed liquids 22 having ionic constituents and non-ionic constituents are pumped 32 through a pretreatment filtration unit 20, for removal of micron-sized particles and delivery of the filtrate 28 to the mixing tank 30 for blending of a variety of concentrated liquids. The goal is to manage separate concentrated liquid streams 58', 72' in order to reduce the average concentration of ionic constituents and dissolved solids in mixed liquids transferred 34 to additional treatment units 44, 50, 60. The integrated system 18' provides for blending in the mixing tank 30 of two or more liquids including the pretreated feed liquids 28, deionized product liquids 58' from an ED unit, and non-specification liquids 72' from treatment in a NF or RO unit, in order to reduce the average concentration of ionic constituents and dissolved solids in permeate liquids in the mixing tank 30 before treatment. The mixed liquids are transferred 34 and pressurized by the second pump means 36 for transfer 38 to a NF unit 44, or to a RO unit 50, for pressure-driven removal of constituents such as inorganic compounds and soluble contaminants such as synthetic dyes and organic compounds. If a decontaminated product liquid 76' is needed which is not deionized, then an effluent product liquid 76' is separated from the NF/RO unit for use in commerce. If additional deionization treatment is preferred, the pressure treated liquid 58" is transferred to an ED unit 60 for deionization and separation as decontaminated and deionized product liquid 76. The integrated EPM system 18' includes an operator adjusted control means 80 providing transfer of the reject liquid 72' from the NF/RO unit to the mixing tank 30, and transfer of a partially deionized fluid 58' from the ED unit 60 to the mixing tank 30 for further mixing and additional treatment. The final product can be either the NF or RO treatment unit effluent separated as a product liquid 76', or the decontaminated and deionized product liquid 76 from the ED unit 60. Either product liquid 76, 76' is decontaminated at efficiencies of at least 98%, for production of reclaimed liquids having sufficient purity to meet "virgin" liquid specifications.

Figure 8:
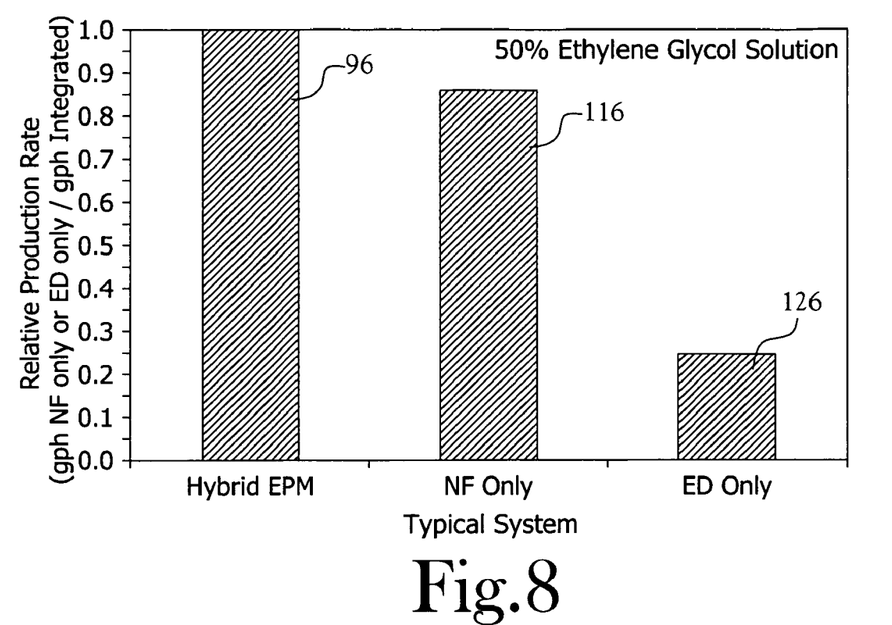
FIG. 8 is a graphical representation of relative production rate for an integrated EPM system treating feed liquids of about 50% ethylene glycol compared to a NF only system or a ED only system.
Figure 9:
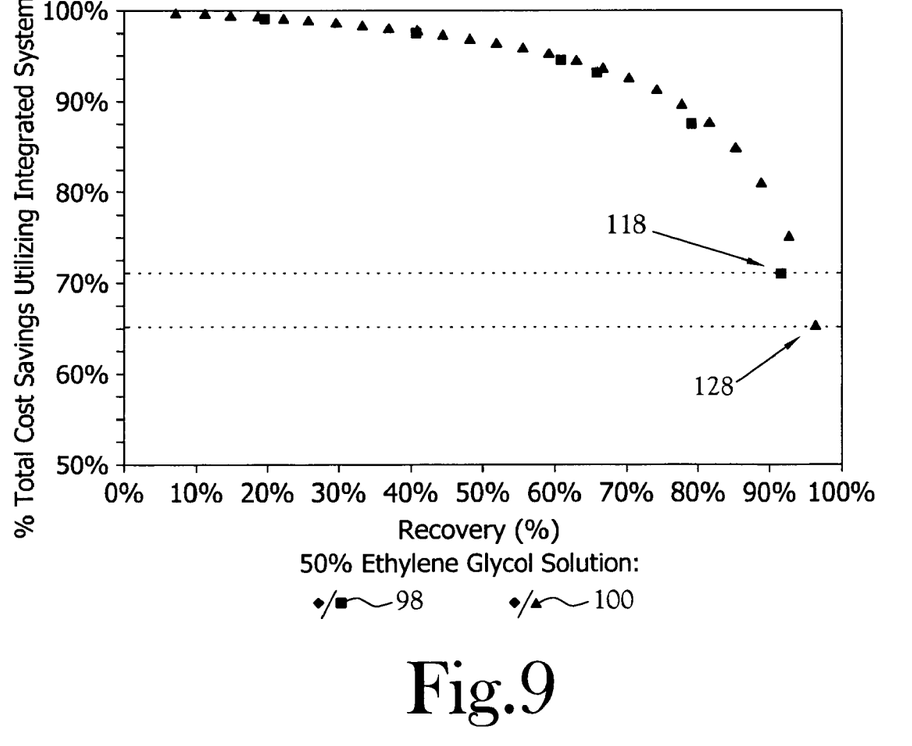
FIG. 9 is a graphical representation of total cost savings for an integrated EPM system compared to a NF only system or an ED only system.
Figure 10:
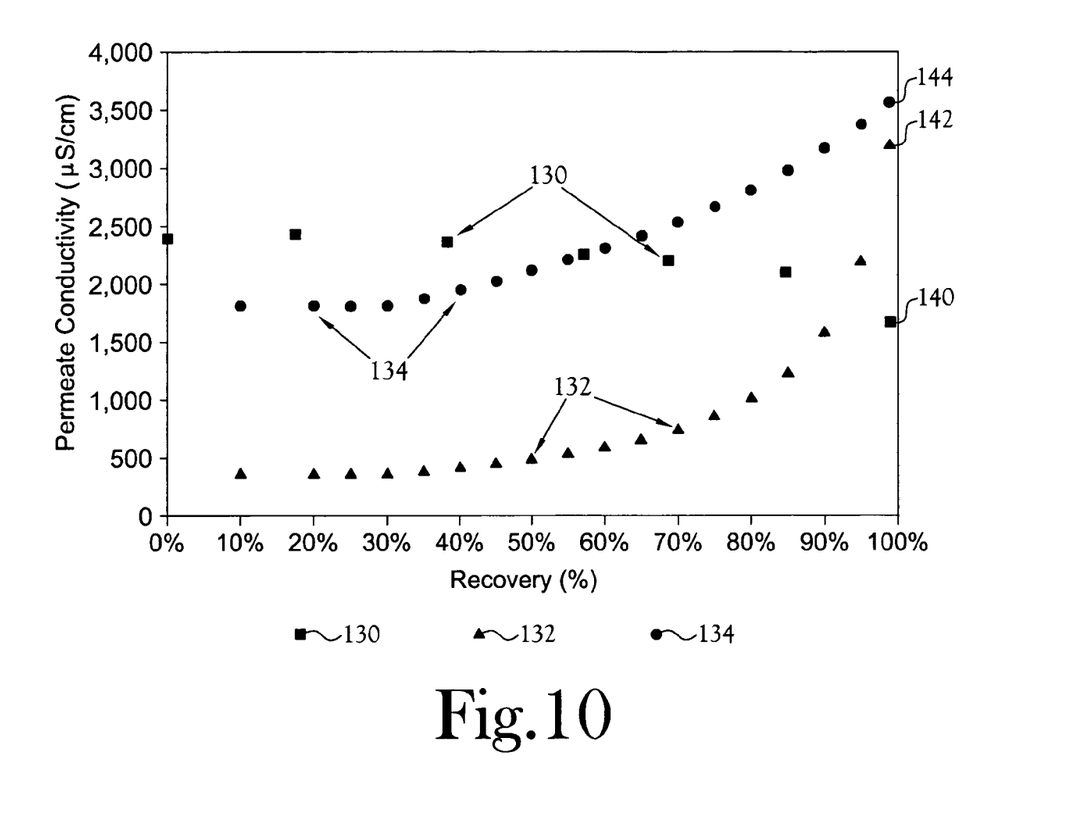
FIG. 10 is a graphical representation of permeate conductivity verse recovery for an integrated EPM system compared to a NF only system or an ED only system.

Benefits of the integrated EPM systems described herein include high production rates for decontaminating ethylene glycol with recovery rates in excess of 98%, with high gallons per hour (gph) throughput as illustrated for an integrated EPM system 96, compared to NF only 116, or ED only 126 systems (see FIG. 8). Additional benefits for the integrated EPM systems include relatively low capital expenditures and operating costs, leading to significant total cost savings of about 75% for integrated EPM systems 98 having recovery efficiencies of 98+%, compared to the costs to obtain a maximum practical NF only recovery efficiency of about 90% for NF only systems 118 (see FIG. 9). Alternately, significant total cost savings of about 65% for integrated EPM systems 100 having recovery efficiencies of 98+% for integrated EPM systems 98, compared to the costs to obtain a maximum practical recovery efficiency of about 96% for ED only systems 128 (see FIG. 9). The integrated EPM systems typically do not generate hazardous by-products, are easy to operate, control and automate, and easy to maintain. Also, studies indicate that the invention is capable of producing a product with extremely low conductivity levels (down to as low as 2.6 µMho/cm). Those skilled in the art will recognize that this represents a substantial improvement compared to traditional ED designs, which are typically limited to product with conductivities >30 µMho/cm. As a result, the invention would represent a new pretreatment option for production of ultra-pure water. The results of a plurality of production runs of varying lengths and with different configurations of treatment units are illustrated in FIGS. 6-10. Production runs have indicated that the embodiments of the integrated EPM system are a substantial improvement over traditional designs. As illustrated in FIG. 10, comparisons of permeate conductivity as a function of recovery for feed liquids of 50% ethylene glycol solution, indicate that the integrated EPM systems 130 readily perform at 98+% efficiency 140, compared to RO only systems 132 providing about 96-97% efficiency 142, or NF only systems 134 providing about 90-97% efficiency 144. Those skilled in the art will recognize that the improved design of the integrated EPM systems result in each ED membrane cell stack requiring significantly less ED membrane area while being more energy efficient.

In addition to the described use of the method and apparatus to decontaminate and deionize used antifreeze, the system may be used to decontaminate and deionize wash water (vehicular, laundry, mop water, trailer/tank washout, textile rinses, metal, aqueous parts cleaners), oil and gas field fluids (glycol base natural gas dehydration fluids, glycol/water heat transfer fluids, amines from treatment of natural gas, produced water), other thermal transfer fluids (secondary coolants from HVAC systems and coolants from ice-skating rinks), cooling water reuse, nuclear wastewater, mixed wastewater having nuclear/radioactive and hazardous/chemical contaminates, hazardous wastewater, desalination of sea or brackish water, and drinking water production and/or provide pretreatment for ultra-pure water production.

While the present invention has been illustrated by description and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for electrodialysis treatment of contaminated feed liquids, comprising:

a pretreatment filtration unit having at least one filtration membrane through which contaminated feed liquids are directed, said at least one filtration membrane having sufficient pore diameters to deny passage of insoluble particles and to allow passage of filtrate liquids, said pretreatment filtration unit having at least one effluent channel for passage of said filtrate liquids;

a mixing unit in hydraulic connection with said at least one effluent channel of said pretreatment filtration unit, said mixing unit including means for mixing fluids transferred to said mixing unit; and an electrodialysis unit in hydraulic connection with said mixing unit, said electrodialysis unit including a stacked configuration of a plurality of interdisposed anion cell membranes and cation cell membranes interleaved with a plurality of spacers, said electrodialysis unit providing at least one fluid path therethrough for movement of said filtrate liquids whereby a partially deionized product diluate liquid and concentrated ion fluid are separated from said filtrate liquids by at least one fluid path through said stacked configuration of said electrodialysis unit with said concentrated ion fluid channeled for release from said electrodialysis unit;

a recycle conduit through which partially deionized fluids are transferred to said mixing unit for blending;

a pressure-driven filtration unit including at least one of a nanofiltration or reverse osmosis membrane through which said blended feed liquid is channeled for separation of ionic and nonionic contaminants from said blended feed liquid, at least one of said nanofiltration or reverse osmosis membrane having a plurality of fluid paths through which said blended feed liquid is pressure driven whereby said pressure-driven filtration unit separates said blended feed liquid into a decontaminated product liquid and a concentrated liquid;

an effluent channel for release of said decontaminated product liquid from said pressure-driven filtration unit; and at least one recycle channel through which said concentrated liquid is transferred to said mixing unit for blending.

2. The apparatus of claim 1 further comprising:

a computer circuitry controlling flow of filtrate liquids transferred through said mixing tank and said electrodialysis unit, whereby said computer circuitry controls flow to said electrodialysis unit in parallel with movement of said filtrate liquid through at least one of said nanofiltration or reverse osmosis membrane thereby said decontaminated product liquid is separated from said concentrated liquid.

3. The apparatus of claim 1 further comprising:

a computer circuitry controlling flow of blended filtrate liquids transferred to said mixing tank and said electrodialysis unit, whereby said computer circuitry controls flow independently to said electrodialysis unit in parallel with said blended feed liquid channeled at an independent flow rate through at least one of said nanofiltration or reverse osmosis membrane thereby said decontaminated product liquid is separated from said concentrated liquid.

4. The apparatus of claim 1 wherein said electrodialysis unit further includes:

said stacked configuration having at least one each of anion and cation ion exchange membranes; and said plurality of spacers interleaved with said anion and cation ion exchange membranes to define said stacked configuration through which said pretreated filtrate liquids are transferred by application of continuous liquid flow therethrough whereby said ionic constituents are diverted for removal from said stacked configuration and said ion concentrated liquid is separated for release from said electrodialysis unit.

5. A method of electrodialysis and pressure driven filtration treatment of contaminated feed liquids comprising the steps of:

pretreating by filtration of contaminated feed liquids having inorganic contaminants and organic contaminants mixed therein, wherein said pretreating step removes particulates and generates pretreated filtrate liquids;

channeling said pretreated filtrate liquids to a mixing unit for blending with additional liquids;

directing said mixed pretreated filtrate liquids through a nanofiltration or reverse osmosis membrane unit providing pressure induced liquid transfer across permeable membranes thereby generating a permeate liquid stream and a concentrated reject liquid;

deionizing said blended filtrate liquids by pumping through a multiple flow path electrodialysis unit, said step of electrically treating producing a partially deionized diluate liquid portion channeled to a storage unit, and further producing a concentrate liquid portion directed for exiting said electrodialysis unit;

channeling said partially deionized diluate liquid portion from the electrodialysis unit for mixing in said mixing unit with said pretreated filtrate liquids; and redirecting said concentrated reject liquid from said nanofiltration or reverse osmosis membrane for mixing in said mixing unit with said partially deionized diluate liquid portion wherein said liquids blended in the mixing unit are the concentrate and deionized diluate.

6. The method of claim 5 wherein said step of deionizing includes:

providing said multiple flow path electrodialysis unit with a plurality of electrodialysis membranes in a stacked configuration including a cathode electrode plate and an anode electrode plate between which a plurality of spacers are interleaved with said plurality of electrodialysis ion exchange membranes whereby a plurality of fluid flow paths are maintained within said electrodialysis unit; and supplying a voltage differential between said cathode electrode plate and said anode electrode plate, whereby said step of deionizing produces said partially deionized diluate liquid for recycled to the mix unit and said concentrated liquid directed for existing said electrodialysis unit.

7. The method of claim 6 wherein said contaminated feed liquids include glycol based thermal transfer liquids.

8. A membrane-based process for treating contaminated feed liquids, comprising the steps of:

providing contaminated feed liquids having a plurality of insoluble and soluble contaminants and ionic constituents therein;

removing insoluble insoluble contaminants from said contaminated feed liquids in a pretreatment filtration unit for generating a pretreated filtrate liquid;

channeling said pretreated filtrate liquid to a mixing unit for blending thereby forming a blended filtrate liquid;

substantially simultaneously transferring an independently controlled selected flow of said blended filtrate liquid to an electric-driven membranes unit and an independently controlled selected flow of said blended filtrate liquid to a nanofiltration or reverse osmosis unit, thereby substantially simultaneously separating ionic constituents and producing a diluate in said blended filtrate liquid during passage through said electric-driven membrane unit and forming a separated ionic concentrate during passage of said selected flow through said nanofiltration or reverse osmosis unit;

substantially simultaneously continuously redirecting flow of diluate from said electric-driven unit and a selected flow of said concentrate stream from said nanofiltration or reverse osmosis unit to said mixing unit for additionally blending and further treatment within said nanofiltration or reverse osmosis unit and within said electric-driven ionic separation unit;

and removing deionized product liquid from sand nanofiltration or reverse osmosis unit for reused.

9. The process of claim 8 wherein said pressure-driven membrane unit is pressurized to pressures between about 50 pounds per square inch to about 400 pounds per square inch.

10. The process of claim 8 wherein said pressure-driven membrane unit is pressurized to pressures between about 200 pounds per square inch to about 1,000 pounds per square inch.

* * * * *